(12) United States Patent
Yoon et al.

(10) Patent No.: US 9,201,183 B2
(45) Date of Patent: Dec. 1, 2015

(54) OPTICAL FILM

(75) Inventors: Hyuk Yoon, Gwangmyeong-si (KR);
Byoung Kun Jeon, Daejeon (KR);
Moon Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 174 days.

(21) Appl. No.: 13/584,544

(22) Filed: Aug. 13, 2012

(65) Prior Publication Data

US 2013/0044286 A1 Feb. 21, 2013

Related U.S. Application Data

(63) Continuation of application No. PCT/KR2012/002829, filed on Apr. 13, 2012.

(30) Foreign Application Priority Data

Apr. 13, 2011 (KR) .................. 10-2011-0034339
Apr. 13, 2012 (KR) .................. 10-2012-0038465

(51) Int. Cl.
*G02B 5/30* (2006.01)
*G02F 1/13363* (2006.01)

(52) U.S. Cl.
CPC ............ *G02B 5/3016* (2013.01); *G02B 5/3033* (2013.01); *G02B 5/3083* (2013.01); *G02F 1/13363* (2013.01); *G02F 2001/133637* (2013.01); *G02F 2001/133638* (2013.01)

(58) Field of Classification Search
CPC ............... G02F 1/13363; G02F 2001/133637; G02F 2001/133638; G02B 5/3016; G02B 5/3033

USPC ............................. 349/117–119, 121, 75, 76
See application file for complete search history.

(56) References Cited

U.S. PATENT DOCUMENTS

| 6,108,059 A | * | 8/2000 | Yang .............................. 349/65 |
| 2005/0190327 A1 | * | 9/2005 | Lin et al. ....................... 349/119 |
| 2006/0060821 A1 | * | 3/2006 | Fujisawa et al. .......... 252/299.01 |
| 2006/0192913 A1 | | 8/2006 | Shutou |
| 2008/0068545 A1 | * | 3/2008 | Doi et al. ..................... 349/118 |
| 2009/0185111 A1 | * | 7/2009 | Uesaka et al. ................. 349/75 |
| 2012/0133871 A1 | * | 5/2012 | Saigusa et al. ............... 349/108 |

FOREIGN PATENT DOCUMENTS

| JP | 2000284126 | 10/2000 |
| JP | 2008129465 | 5/2008 |
| JP | 2010015045 | 1/2010 |
| JP | 2012189686 | 10/2012 |
| TW | 200419198 A | 10/2004 |
| WO | 2008001582 | 1/2008 |

* cited by examiner

*Primary Examiner* — Richard Kim
*Assistant Examiner* — Kendrick Hsu
(74) *Attorney, Agent, or Firm* — Dentons US LLP

(57) ABSTRACT

An optical film, a circular polarizing plate, and a display device are provided. The optical film may exhibit a desired phase retardation property in a wide wavelength range even when it is relatively thin. The optical film may exhibit the ¼ wavelength phase retardation property. The optical film may be manufactured by a simple process. The optical film may be used in LCDs such as a reflective LCD, or OLEDs.

32 Claims, 5 Drawing Sheets

OPTICAL FILM

This application is a continuation application (bypass application), under 35 USC §120, of International Patent Application No. PCT/KR2012/002829, filed on Apr. 13, 2012, which claims priority to and the benefit of Korean Patent Application Nos. 10-2011-0034339, filed on Apr. 13, 2011, and 10-2012-0038465, filed on Apr. 13, 2012, which are hereby incorporated by reference in their entirety herein.

BACKGROUND

1. Field of the Invention

The present application relates to an optical film, a circular polarizing plate and a display device.

2. Discussion of Related Art

A retardation film may be used in various fields. The retardation films may be on one or both sides of a liquid crystal cell for improving the viewing angle of a liquid crystal display (LCD). In Japanese Patent Publication No. 1996-321381, retardation films are used to prevent reflection and ensure visibility of a reflective LCD or an organic light emitting device (OLED).

As retardation films, there are ½ or ¼ wavelength retardation film according to its phase retardation property. However, the phase retardation property of a conventional ½ or ¼ wavelength retardation film is changed depending on wavelength. Therefore, there is a problem that ranges, within which retardation films function as the ½ or ¼ wavelength retardation film, are restricted to limited ranges. For example, films functioning as the ¼ wavelength retardation films with respect to light having the wavelength of 550 nm don't frequently function as the ¼ wavelength retardation films with respect to light having the wavelength of 450 or 650 nm.

SUMMARY OF THE INVENTION

The present application provides an optical film, a circular polarizing plate and a display device.

An illustrative optical film may include an optically anisotropic polymeric layer and a liquid crystal layer on the polymeric layer. In the optical film, the polymeric layer and the liquid crystal layer may be arranged such that an optical axis of the polymeric layer may be perpendicular to an optical axis of the liquid crystal layer or such that the optical axis of the polymeric layer may form an angle of approximately 61.5 degrees with the optical axis of the liquid crystal layer. The term "optical axis" as used herein may refer to a slow axis or a fast axis, and unless defined otherwise, it may refer to the slow axis. In this document, the term "vertical," "perpendicular," "horizontal" or "parallel" as used herein may refer to substantial vertical, perpendicular, horizontal or parallel falling within the range in which predetermined results can be obtained. For example, the above term may include errors within about ±15 degrees, ±10 degrees, ±5 degrees, or ±3 degrees. In this document, the above angle of 61.5 degrees may refer to substantial 61.5 degrees falling within the range in which predetermined results can be obtained, and may include errors within about ±15 degrees, ±10 degrees, ±5 degrees, or ±3 degrees.

FIG. 1 shows an illustrative embodiment of an optical film 100, including a polymeric layer 101 and a liquid crystal layer 102. For example, as shown in FIG. 2, an optical film 200 may further include an alignment layer 201 between the polymeric layer 101 and the liquid crystal layer 102.

In one embodiment, the optical film may be a film having the ¼ wavelength phase retardation property. The term "n wavelength phase retardation property" as used herein may refer to the property capable of phase-retarding incident light by "n" times a wavelength of the incident light within at least partial wavelength range. In one embodiment, the in-plane phase retardation to light with a wavelength of 550 nm of the optical film may be in the range from about 110 nm to about 220 nm, or from about 140 nm to about 170 nm. The term "in-plane phase retardation of an optical film, a polymeric layer or a liquid crystal layer" as used herein may refer to a value calculated as "(nx−ny)×d." The "nx" is a refractive index along an in-plane slow axis direction of the optical film, polymeric layer or liquid crystal layer, the "ny" is a refractive index along an in-plane fast axis of the optical film, polymeric layer or liquid crystal layer, and the "d" is a thickness of the optical film, polymeric layer or liquid crystal layer.

The optical film may, for example, have the reverse wavelength dispersion properties. For example, the optical film may be a film, of which R(650)/R(550) is larger than R(450)/R(550). The mark "R(X)" as used herein may refer to in-plane phase retardation of the optical film, polymeric layer or liquid crystal layer with respect to light with a wavelength of "X" nm. In one embodiment, the optical film may have R(450)/R(550) in the range from 0.81 to 0.99, from 0.82 to 0.98, from 0.83 to 0.97, from 0.84 to 0.96, from 0.85 to 0.95, from 0.86 to 0.94, from 0.87 to 0.93, from 0.88 to 0.92 or from 0.89 to 0.91. The optical film may have R(650)/R(550) in the range from 1.01 to 1.19, from 1.02 to 1.18, from 1.03 to 1.17, from 1.04 to 1.16, from 1.05 to 1.15, from 1.06 to 1.14, from 1.07 to 1.13, from 1.08 to 1.12 or from 1.09 to 1.11.

The polymeric layer in the optical film may be a layer having the ½ wavelength phase retardation property. The polymeric layer may have in-plane phase retardation with respect to light with a wavelength of 550 nm in the range from 200 to 290 nm or from 220 to 270 nm. Absolute values of the difference between R(450)/R(550) of the polymeric layer and R(650)/R(550) of the polymeric layer may be within 5, 4, 3, 2, or 1 or may be substantially 0. In one embodiment, the polymeric layer may have R(450)/R(550) in the range from 0.95 to 1.05 or from 0.99 to 1.01, and may have R(650)/R(550) in the range from 0.95 to 1.05 or from 0.99 to 1.01.

The polymeric layer in the optical film may be a polymer film. For example, a film prepared by suitably stretching a transparent polymer film, in which optical anisotropies can be generated by stretching, may be used as the polymeric layer. Non-stretched polymer films may also be used as the polymeric layer as long as they have optical anisotropies. In one embodiment, as the polymer film, a film formed by an absorbent-casting method and having light transmittances of 70% or more, 80% or more or 85% or more may be used. Conventionally, the polymer film may have a thickness in the range of 3 mm or less, from 1 μm to 1 mm, or from 5 μm to 500 μm in consideration of possibilities to form an uniform stretched film.

Examples of the polymer film may include a polyolefin film such as a polyethylene film or polypropylene film, a cycloolefin polymer (COP) film such as a polynorbornene film, a polyvinylchloride film, a polyacrylonitrile film, a polysulfone film, a polyacrylate film, a poly(vinyl alcohol) (PVA) film, a cellulose ester polymer film such as a triacetyl cellulose (TAC) film, or a copolymer film of at least two monomers selected from the monomers forming the polymer as described above. In one embodiment, as a polymer film, a cycloolefin polymer film may be used. The cycloolefin polymer may be, but is not limited to, a ring-opening polymer of cycloolefin such as norbornene or a hydrogenated product of the ring-opening polymer, an addition polymer of the cycloolefin, a copolymer of the cycloolefin and another comonomer such as alpha-olefin, or a graft polymer which is the polymer or copolymer modified by unsaturated carboxylic acid or a derivative thereof.

The polymeric layer may have an optical axis which is formed to be parallel to a lengthwise direction (MD, mechanical direction) or a breadthwise direction (TD, transverse direction), or may have an optical axis which forms a certain angle with the lengthwise or breadthwise direction. In one embodiment, the optical axis of the polymeric layer may form 45 degrees or 67.5 degrees with the lengthwise or breadthwise direction, or may form an angle falling within the range from 45 to 67.5 degrees with the lengthwise or breadthwise direction. The angle of 45 or 67.5 degrees is substantially 45 or 67.5 degrees within the range in which a predetermined effect is not damaged, and may include an error, for example, within ±10 degrees, ±5 degrees or ±3 degrees.

The optical axis of the polymeric layer may be controlled by controlling stretching axis during stretching a polymer film in case where the polymeric layer is the stretched polymer film.

The polymeric layer may have a thickness of, for example, 1 mm or less, from 1 to 500 μm, or from 5 to 300 μm, and the thickness may vary according to a purpose.

The liquid crystal layer of the optical film may be a layer having the ¼ wavelength phase retardation property. The liquid crystal layer may have in-plane phase retardation with respect to light with a wavelength of 550 nm in the range from 95 nm to 145 nm or from 105 nm to 120 nm. The liquid crystal layer may be a layer, of which R(450)/R(550) is larger than R(650)/R(550). In one embodiment, the liquid crystal layer may have R(450)/R(550) in the range from 1.01 to 1.19, from 1.02 to 1.18, from 1.03 to 1.17, from 1.04 to 1.16, from 1.05 to 1.15, from 1.06 to 1.14, from 1.07 to 1.13, or from 1.08 to 1.12, and may have R(650)/R(550) in the range from 0.81 to 0.99, from 0.82 to 0.98, from 0.83 to 0.97, from 0.84 to 0.96, from 0.85 to 0.95, or from 0.86 to 0.94.

The liquid crystal layer may include polymerizable liquid crystal compound. In one embodiment, the liquid crystal layer may include a polymerizable liquid crystal compound in a polymerized state. The term "polymerizable liquid crystal compound" as used herein may refer to a compound including a moiety capable of exhibiting liquid crystalline property, for example, a mesogen, and also including at least one polymerizable functional group. The term "polymerizable liquid crystal compound in a polymerized state" as used herein may refer to a state where the liquid crystal compounds are polymerized and thereby form a backbone such as a main chain or side chain of a liquid crystal polymer in the liquid crystal layer.

In one embodiment, the liquid crystal layer may also include a polymerizable liquid crystal compound that is not polymerized, or may further include at least one conventional additive such as a polymerizable non-liquid crystalline compound, a stabilizer, a non-polymerizable non-liquid crystalline compound or an initiator.

In one embodiment, the polymerizable liquid crystal compound included in the liquid crystal layer may include at least one multifunctional polymerizable liquid crystal compound and at least one monofunctional polymerizable liquid crystal compound.

The term "multifunctional polymerizable liquid crystal compound" as used herein may refer to a liquid crystal compound including at least two polymerizable functional groups among the liquid crystal compounds. In one embodiment, the multifunctional polymerizable liquid crystal compound may include 2 to 10, 2 to 8, 2 to 6, 2 to 5, 2 to 4, 2 to 3, or 2 polymerizable functional groups. Also, the term "monofunctional polymerizable liquid crystal compound" as used herein may refer to a liquid crystal compound including one polymerizable functional group among the liquid crystal compounds.

If the liquid crystal layer includes both of the multifunctional and monofunctional polymerizable compounds, the phase retardation properties of the liquid crystal layer may be effectively controlled, and the realized phase retardation properties, for example, the optical axis and a phase retardation value thereof, may be stably maintained.

The liquid crystal layer may include the monofunctional polymerizable liquid crystal compound in an amount of greater than 0 parts by weight and not more than 100 parts by weight, 1 to 90 parts by weight, 1 to 80 parts by weight, 1 to 70 parts by weight, 1 to 60 parts by weight, 1 to 50 parts by weight, 1 to 30 parts by weight or 1 to 20 parts by weight, relative to 100 parts by weight of the multifunctional polymerizable liquid crystal compound.

The effect obtained by mixing the multifunctional and monofunctional polymerizable liquid crystal compounds may be maximized within the above weight ratios. Also, the liquid crystal layer may exhibit an excellent adhesive property to the adhesive layer. Unless defined otherwise, the unit "part by weight" may refer to a weight ratio herein.

In one embodiment, the multifunctional or monofunctional polymerizable liquid crystal compound may be a compound represented by Formula 1.

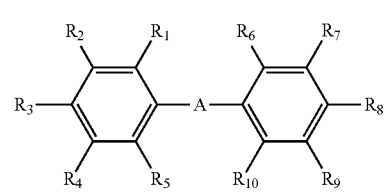

[Formula 1]

In Formula 1, A may be a single bond, —COO— or —COO—, and $R_1$ to $R_{10}$ may be each independently hydrogen, a halogen, an alkyl group, an alkoxy group, an alkoxycarbonyl group, a cyano group, a nitro group, —O-Q-P or a substituent represented by the following Formula 2, or a pair of two adjacent substituents among $R_1$ to $R_5$ or a pair of two adjacent substituents among $R_6$ to $R_{10}$ is joined together to form a benzene ring substituted with —O-Q-P, with the proviso that at least one of the $R_1$ to $R_{10}$ is —O-Q-P or a substituent of the Formula 2, or a pair of two adjacent substituents among $R_1$ to $R_5$ or a pair of two adjacent substituents among $R_6$ to $R_{10}$ is joined together to form a benzene ring substituted with —O-Q-P, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

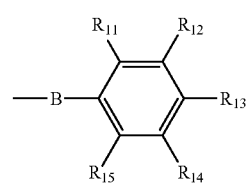

[Formula 2]

In Formula 2, B may be a single bond, —COO— or —OCO—, and $R_{11}$ to $R_{15}$ may be each independently hydrogen, a halogen, an alkyl group, an alkoxy group, an alkoxycarbonyl group, a cyano group, a nitro group or —O-Q-P, or a pair of two adjacent substituents among $R_{11}$ to $R_{15}$ is joined together to form a benzene ring substituted with —O-Q-P, with the proviso that at least one of substituents $R_{11}$ to $R_{15}$ is —O-Q-P, or two adjacent substituents among $R_{11}$ to $R_{15}$ are joined together to form a benzene ring substituted with —O-Q-P, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

In Formulas 1 and 2, the term "two adjacent substituents being joined together to form a benzene ring substituted with —O-Q-P" may refer to the two adjacent substituents being joined together so as to form a naphthalene backbone substituted with —O-Q-P as a whole.

In Formula 2, the mark "-" indicated on the left side of the "B" may refer to the "B" being directly bound to the benzene ring of Formula 1.

In Formulas 1 and 2, the term "single bond" may mean that no atom is present in a site represented by the "A" or "B." For example, if the "A" in Formula 1 is a single bond, the benzene rings disposed on both sides of A may be directly bound to form a biphenyl structure.

In Formulas 1 and 2, the halogen may be, for example, chlorine, bromine or iodine.

Unless defined otherwise, the term "alkyl group" as used herein may refer to, for example, a linear or branched alkyl group having 1 to 20 carbon atoms, 1 to 16 carbon atoms, 1 to 12 carbon atoms, 1 to 8 carbon atoms or 1 to 4 carbon atoms, or, for example, a cycloalkyl group having 3 to 20 carbon atoms, 3 to 16 carbon atoms or 4 to 12 carbon atoms. The alkyl group may be optionally substituted with one or more substituents.

Unless defined otherwise, the term "alkoxy group" as used herein may refer to, for example, an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. Also, the alkoxy group may be optionally substituted with one or more substituents.

Unless defined otherwise, the term "alkylene group or alkylidene group" may refer to, for example, an alkylene group or alkylidene group having 1 to 12 carbon atoms, 4 to 10 carbon atoms or 6 to 9 carbon atoms. The alkylene group or alkylidene group may be, for example, linear, branched or cyclic. Also, the alkylene group or alkylidene group may be optionally substituted with one or more substituents.

Unless defined otherwise, the term "alkenyl group" may refer, for example, to an alkenyl group having 2 to 20 carbon atoms, 2 to 16 carbon atoms, 2 to 12 carbon atoms, 2 to 8 carbon atoms or 2 to 4 carbon atoms. The alkenyl group may be, for example, linear, branched or cyclic. Also, the alkenyl group may be optionally substituted with one or more substituents.

In one embodiment, in Formulas 1 and 2, the "P" may be, for example, an acryloyl group, a methacryloyl group, an acryloyloxy group or a methacryloyloxy group; or, for example, an acryloyloxy group or a methacryloyloxy group. In another embodiment, the "P" may be, for example, an acryloyloxy group.

In this document, examples of the substituent that may be substituted with a certain functional group may include an alkyl group, an alkoxy group, an alkenyl group, an epoxy group, a cyano group, a carboxyl group, an acryloyl group, a methacryloyl group, an acryloyloxy group, a methacryloyloxy group or an aryl group, but it is not limited thereto.

In one embodiment, the "—O-Q-P" or the substituent represented by the Formula 2 which may be included at least one position selected from the group consisting of the $R_1$ to $R_{10}$ or the group consisting of the $R_{11}$ to $R_{15}$ in Formulas 1 and 2 may be, for example, included in a position of $R_3$, $R_8$ or $R_{13}$. In one embodiment, substituents that may be joined together to form a benzene ring substituted with —O-Q-P may be, for example, $R_3$ and $R_4$, or $R_{12}$ and $R_{13}$. Also, in Formulas 1 and 2, the substituents other than the —O-Q-P or the substituent of Formula 2, or the substituents other than the substituents being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, a cyano group, an alkoxy group having 1 to 4 carbon atoms, or a nitro group; or in another embodiment, they may be, for example, chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The polymerizable liquid crystal compounds may be included under the state where they are horizontally aligned. In one embodiment, the polymerizable liquid crystal compounds may be polymerized under the state where they are horizontally aligned. The term "being horizontally aligned" as used herein may mean that the optical axis of the liquid crystal layer including a polymerized liquid crystal compound has an inclination angle of approximately 0 to 25 degrees, approximately 0 to 15 degrees, approximately 0 to 10 degrees, approximately 0 to 5 degrees, or approximately 0 degree with respect to the plane of the liquid crystal layer.

In one embodiment, a difference between the refractive index of the liquid crystal layer in the in-plane slow axis direction and the refractive index of the liquid crystal layer in the in-plane fast axis direction may be from 0.05 to 0.2, from 0.07 to 0.2, from 0.09 to 0.2 or from 0.1 to 0.2. The term "refractive index of or in the in-plane slow axis direction" may refer to a refractive index in a direction in which the maximum value of the refractive index is measured in to the plane of the liquid crystal layer, and the term "refractive index of or in the in-plane fast axis direction" may refer to a refractive index in a direction in which the minimum value of the refractive index is measured in the plane of the liquid crystal layer. In general, the fast axis and slow axis in an optically anisotropic liquid crystal layer are formed to be vertical to each other. The refractive indexes may be measured with respect to light having a wavelength of 550 nm or 589 nm. The difference between the refractive indexed may be measured by using Axoscan (commercially available from Axomatrix) according to the manufacturer's manual.

The liquid crystal layer may have a thickness in the range from approximately 0.5 to 2.0 μm or from 0.5 to 1.5 μm.

The liquid crystal layer having the refractive indexes and the thickness described above may realize a phase retardation property suitable for a purpose to be applied.

As shown in FIG. 2, an illustrative optical film 200 may further include an alignment layer 201 between the polymeric layer 101 and the liquid crystal layer 102. The alignment layer may serve to control the optical axis of the liquid crystal layer by orienting the liquid crystal compound in the step of forming the optical film. As the alignment layer, a conventional alignment layer known in the art, for example, an alignment layer formed by an imprinting method, a photo-alignment layer, or a rubbing alignment layer may be used. The alignment layer may be an optional element, and thus an alignment property may be given by directly rubbing or stretching the polymeric layer without the alignment layer.

The present application is also directed to a method of manufacturing an optical film. One illustrative method may include forming a liquid crystal layer on an optically anisotropic polymeric layer so as for an optical axis of the liquid crystal layer to be perpendicular to an optical axis of the polymeric layer or to form angle of approximately 61.5 degrees with the optical axis of the polymeric layer.

In one illustrative method, it may apply the description of the liquid crystal layer and the polymeric layer made above to details of the polymeric layer and the liquid crystal layer.

The liquid crystal layer may be formed by forming the alignment layer on the polymeric layer, and forming a coating layer of a liquid crystal composition including the polymerizable liquid crystal compound described above on the alignment layer and then polymerizing the aligned liquid crystal composition in the state where the liquid crystal composition is aligned.

The alignment layer may be formed by a method including forming a polymer layer such as polyimide layer on the polymeric layer and then rubbing the polymer layer; a method including coating photo-alignable compounds and aligning them by irradiating with linearly polarized light; or an imprinting method such as nano imprinting. In this field, various methods capable of forming the alignment layer are known, considering the alignment direction forming the liquid crystal layer having the optical axis, for example, the optical axis that is perpendicular to or forms an angle of approximately 61.5 degrees with the optical axis of the polymeric layer, which has been described above.

The coating layer of the liquid crystal composition may be formed by coating the composition on the alignment layer on the polymeric layer by a known method. The composition may be aligned along an alignment pattern of the alignment layer under the coating layer and then polymerized, thereby forming the liquid crystal layer.

In one illustrative method, the liquid crystal layer may be formed on the optically-anisotropic polymeric layer by transferring the polymeric layer in one direction. In the method, the transfer direction, along which the optically anisotropic polymeric layer is transferred, may form an angle of approximately 45 degrees or 67.5 degrees with the optical axis of the optically anisotropic polymeric layer or may form an angle falling within the range from approximately 45 or 67.5 degrees with the optical axis of the optically anisotropic polymeric layer.

Referring to FIG. 3, the transfer direction M of the polymeric layer 101 forms an angle of $\theta_1$ degrees with the optical axis OP of the polymeric layer 101. The "$\theta_1$" may be an angle of 45 or 67.5 degrees, or fall within a range from 45 to 67.5 degrees.

During transferring the polymeric layer 101 along the transfer direction M, the liquid crystal layer is formed so as for the optical axis OL of the liquid crystal layer to be perpendicular to the optical axis OP of the polymeric layer 101 or to form an angle of approximately 61.5 degrees with the optical axis OP of the polymeric layer 101. The liquid crystal layer may be formed by the above-mentioned method.

According to the method as described above, the optical film may be more efficiently manufactured. Particularly, the optical film can be continuously and effectively manufactured if the method is affiliated with an integration process with a following linear polarizer.

The present application is also directed to a circular polarizing plate. In one embodiment, the circular polarizing plate may include a linear polarizer and the optical film. In one embodiment, the optical film may be attached to one surface of the linear polarizer. In the circular polarizing plate, a light absorption axis of the linear polarizer may form an angle of approximately 45 or 67.5 degrees with the optical axis of the polymeric layer of the optical film, or may form an angle falling within the range from approximately 45 to 67.5 degrees.

In one illustrative circular polarizing plate, the optical axis of the polymeric layer of the optical film may form an angle of approximately 45 or 67.5 degrees with the light absorption axis of the linear polarizer. In case where the optical axis of the polymeric layer forms an angle of approximately 45 degrees with the light absorption axis of the linear polarizer, the optical axis of the polymeric layer may be substantially perpendicular to the optical axis of the liquid crystal layer. In case where the optical axis of the polymeric layer forms an angle of approximately 67.5 degrees with the light absorption axis of the linear polarizer, the optical axis of the polymeric layer may form an angle of approximately 61.5 degrees with the optical axis of the liquid crystal layer.

FIG. 4 shows one illustrative embodiment of a circular polarizing plate 400, in which the optical film 402 is attached to the linear polarizer 401. Referring to FIG. 4, in one embodiment, in the circular polarizing plate 400, the optical film 402 may be included such that the polymeric layer 101 is disposed closer to the linear polarizer 401 than the liquid crystal layer 102.

The linear polarizer is a functional element capable of extracting light vibrating in one direction from incident light vibrating in various directions. For example, as the linear polarizer, a conventional linear polarizer such as a PVA (poly (vinyl alcohol)) linear polarizer may be used. In one embodiment, the linear polarizer may be a PVA film or sheet to which dichroic dye or iodine is adsorbed and aligned. The PVA may be obtained by gelating polyvinyl acetate. Examples of the polyvinyl acetate may include a monopolymer of vinyl acetate; and a copolymer of vinyl acetate and a different monomer. The different monomer copolymerized with vinyl acetate may be one or at least two of an unsaturated carboxylic acid compound, an olefin compound, a vinyl acetate compound, an unsaturated sulfonic acid compound and an acrylamide compound having an ammonium group. Generally, a gelation degree of polyvinyl acetate may be approximately 85 to 100 mol % or 98 to 100 mol %. In addition, generally, a polymerization degree of PVA used in the linear polarizer may be approximately 1,000 to 10,000 or 1,500 to 5,000.

The linear polarizer and the liquid crystal layer in the optical film may be attached to each other by an adhesive layer. In FIG. 5, an illustrative circular polarizing plate 500 in which an optical film 402 is attached to a linear polarizer 401 by an adhesive layer 501 is shown. The adhesive layer may have a glass transition temperature of 36° C. or more, 37° C. or more, 38° C. or more, 39° C. or more, 40° C. or more, 50° C. or more, 60° C. or more, 70° C. or more, 80° C. or more or 90° C. or more. If the optical film is attached to the linear polarizer using the adhesive layer having the above glass transition temperature, an optical film having excellent durability may be formed. The upper limit of the glass transition temperature of the adhesive layer is not specifically limited, but the glass transition temperature may be approximately 200° C., 150° C. or 120° C.

The adhesive layer may have a thickness of 6 μm or less, 5 μm or less, or 4 μm or less. If the adhesive layer has the above thickness, the durability of the optical film may be suitably maintained. The lower limit of the thickness of the adhesive layer may be 0.1 μm, 0.3 μm or 0.5 μm.

In one embodiment, the adhesive layer may be an active energy ray curable adhesive layer. That is, the adhesive layer may include an adhesive composition cured by irradiation of active energy rays. The term "curing of the adhesive composition" as used herein may refer to expressing an adhesion property by inducing a physical or chemical interaction or reaction of a component in the composition. The term "active energy ray curable composition" as used herein may refer to an adhesive or adhesive composition cured by irradiation of the active energy rays. The "active energy rays" may include particle beams such as alpha-particle beams, proton beams, neutron beams or electron beams, as well as microwaves, infrared rays (IR), UV rays (UV), X rays and gamma rays. In general, the UV rays or electron beams may be used herein.

The adhesive layer may include a radically polymerizable compound or a cationically polymerizable compound. In one embodiment, the radically or cationiically polymerizable compound may be included in a polymerized form in the adhesive layer. In the above, the "radically polymerizable compound" may refer to a compound that may be polymerized by a radical reaction, for example a radical reaction induced by the irradiation with active energy rays to form an adhesive, and the "cationically polymerizable compound" may refer to a compound that may be polymerized by a cationic reaction, for example a cationic reaction induced by the irradiation with active energy rays to form an adhesive. Each of the compounds may be included in the adhesive composition, and then may form an adhesive by being cured.

The adhesive composition may include either a radically polymerizable compound or a cationically polymerizable compound, or include both of the radically polymerizable compound or the cationically polymerizable compound.

Examples of the cationically polymerizable compound may include an epoxy compound, a vinyl ether compound, an oxetane compound, an oxolane compound, a cyclic acetal compound, a cyclic lactone compound, a thiirane compound, a thiovinylether compound, a spirortho ester compound, an ethylenically unsaturated compound, a cyclic ether compound or a cyclic thioether compound. In one embodiment, an epoxy compound may be used as the cationically polymerizable compound.

Examples of the cationically polymerizable epoxy compound may include an epoxy resin, an alicyclic epoxy compound, an aliphatic epoxy compound or an aromatic epoxy compound.

In the above, examples of the epoxy resin may include a cresol novolac epoxy resin or a phenol novolac epoxy resin. The epoxy resin may have a weight average molecular weight ($M_w$) of 1,000 to 5,000 or 2,000 to 4,000. The term "weight average molecular weight" as used herein may refer to a converted value with respect to standard polystyrene, which may be measured by Gel Permeation Chromatograph (GPC). Unless defined otherwise, the term "molecular weight" may mean the "weight average molecular weight." A polymer having a molecular weight of 1,000 or more may be used to properly maintain the durability of an adhesive layer, and a polymer having a molecular weight of 5,000 or less may also be used to maintain the workability such as a coating property of a composition.

The term "alicyclic epoxy compound" as used herein may refer to a compound including at least one alicyclic epoxy group. The term "alicyclic epoxy group" as used herein may refer to a functional group having an aliphatic saturated hydrocarbon ring, and two carbon atoms among the carbon atoms constituting the hydrocarbon ring also constitute an epoxy group.

Examples of the alicyclic epoxy compound may include an epoxycyclohexylmethyl epoxycyclohexanecarboxylate compound; an epoxycyclohexane carboxylate compound of alkanediol; an epoxycyclohexylmethyl ester compound of dicarboxylic acid; an epoxycyclohexylmethyl ether compound of polyethyleneglycol; an epoxycyclohexylmethyl ether compound of alkanediol; a diepoxytrispiro compound; a diepoxymonospiro compound; a vinylcyclohexene diepoxide compound; an epoxycyclopentyl ether compound; or a diepoxy tricyclo decane compound. Specifically, the alicyclic epoxy compound that may be used herein may include at least one selected from the group consisting of an esterification product of 7-oxabicyclo[4,1,0]heptane-3-carboxylic acid and (7-oxa-bicyclo[4,1,0]hepto-3-yl)methanol; an esterification product of 4-methyl-7-oxabicyclo[4,1,0]heptane-3-carboxylic acid and (4-methyl-7-oxa-bicyclo[4,1,0]hepto-3-yl) methanol; an esterification product of 7-oxabicyclo[4,1,0] heptane-3-carboxylic acid and 1,2-ethanediol; an esterification product of (7-oxabicyclo[4,1,0]hepto-3-yl) methanol and adipic acid; an esterification product of (4-methyl-7-oxabicyclo[4,1,0]hepto-3-yl)methanol and adipic acid; and an etherification product of (7-oxabicyclo[4,1,0] hepto-3-yl)methanol and 1,2-ethanediol.

In one embodiment, a difunctional epoxy compound, i.e., a compound having two epoxy groups may be used as the alicyclic epoxy compound, and a compound in which both of the two epoxy groups are alicyclic epoxy groups may be used.

The aliphatic epoxy compound may be an epoxy compound having at least one aliphatic epoxy group that is not the alicyclic epoxy group. Examples of the aliphatic epoxy compound may include polyglycidyl ether of aliphatic polyvalent alcohol; a polyglycidyl ether of an alkyleneoxide addition product of aliphatic polyvalent alcohol; a polyglycidyl ether of polyester polyol of aliphatic polyvalent alcohol and aliphatic polyvalent carboxylic acid; a polyglycidyl ether of aliphatic polyvalent carboxylic acid; a polyglycidyl ether of polyester polycarboxylic acid of aliphatic polyvalent alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of a vinyl monomer other than the glycidyl acrylate and glycidyl methacrylate. In one embodiment, polyglycidyl ether of an aliphatic polyvalent alcohol or an alkyleneoxide addition product of the polyvalent alcohol may be used, but it is not limited thereto.

In the above, the aliphatic polyvalent alcohol may, for example, be an aliphatic polyvalent alcohol having 2 to 20 carbon atoms, 2 to 16 carbon atoms, 2 to 12 carbon atoms, 2 to 8 carbon atoms or 2 to 4 carbon atoms. For example, the aliphatic polyvalent alcohol may include an aliphatic diol such as ethyleneglycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, or 1,10-decanediol; an alicyclic diol such as cyclohexanedimethanol, cyclohexanediol, hydrogenated bisphenol A, or hydrogenated bisphenol F; trimethylolethane, trimethylolpropane, a hexitol, a pentitol, glycerin, polyglycerin, pentaerythritol, dipentaerythritol, or tetramethylolpropane.

In the above, the alkyleneoxide may also be an alkyleneoxide having 1 to 20 carbon atoms, 1 to 16 carbon atoms, 1 to 12 carbon atoms, 1 to 8 carbon atoms or 1 to 4 carbon atoms. For example, ethyleneoxide, propyleneoxide or butyleneoxide may be used herein.

In the above, examples of the aliphatic polyvalent carboxylic acid may also include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylic acid methylenecyclohexane, 1,2,3-propanetricarboxylic acid, 1,2,3,4-butanetetracarboxylic acid, or 1,2,3,4-cyclobutanetetracarboxylic acid, but it is not limited thereto.

In one embodiment, a compound that does not include the alicyclic epoxy group and that includes at least three epoxy groups, or three epoxy groups, may be used as the aliphatic epoxy compound when considering a curing property, weather resistance and refractive index characteristics, but it is not limited thereto.

Examples of the aromatic epoxy compound that may be used herein may include an epoxy compound containing an aromatic group in the molecule, for example, a bisphenol-type epoxy resin such as bisphenol A epoxy, bisphenol F epoxy, bisphenol S epoxy or brominated bisphenol epoxy; a novolac-type epoxy resin such as phenol novolac epoxy resin or cresol novolac epoxy resin; a cresol epoxy resin or a resorcinol glycidyl ether.

As the cationically polymerizable compound, for example, a silane compound having at least one cationically polymerizable functional group may also be used, if necessary. The silane compound may control a surface energy of an adhesive so as to improve an adhesion strength. As the silane compound, for example, a compound represented by the following Formula 3 may be used.

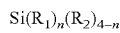   Formula 3

In Formula 3, $R_1$ is a cationically polymerizable functional group bound to the silicon atom, $R_2$ is a functional group bound to the silicon atom, and is, for example, hydrogen, a hydroxyl group, an alkyl group or an alkoxy group, and n is a numberer ranging from 1 to 4.

Examples of the cationically polymerizable functional group may include an alkenyl group such as vinyl group, a vinyloxy group or a cyclic ether group such as a glycidyl group or an oxetanyl group, or a functional group including the cyclic ether group, alkenyl group or vinyloxy group.

In Formula 3, for example, n may be, for example, 1 or 2.

In one embodiment, an oligomeric silane compound that is a silicon resin which has a relatively low molecular weight and of which both ends of a molecular chain are blocked by alkoxysilyl groups and to which the cationically polymerizable functional group is introduced may also be used as the silane compound.

A compound which has a radically polymerizable functional group such as an acryloyl group or a methacryloyl group and may be polymerized to form an adhesive may be used as the radically polymerizable compound.

In one embodiment, the radically polymerizable compound may be an acrylamide compound. The acrylamide compound may be represented by the following Formula 4.

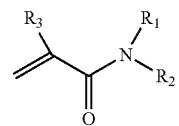

Formula 4

In Formula 4, $R_1$ and $R_2$ are each independently hydrogen, an alkyl group or a hydroxyalkyl group, or $R_1$ and $R_2$ are joined together to form a heterocyclic structure containing a nitrogen atom, and $R_3$ is hydrogen or an alkyl group.

Unless defined otherwise, the term "heterocyclic structure" as used herein may refer to a cyclic structure of cyclic compound having at least two different kinds of atoms as ring-membered atoms. In Formula 4, the heterocyclic structure may include 3 to 20, 3 to 16, 3 to 12 or 3 to 8 ring-membered atoms, including the nitrogen atom in Formula 4 to which $R_1$ and $R_2$ are linked. In addition to the nitrogen atom, an atom that may be included in the heterocyclic structure may include carbon, oxygen or sulfur. Also, the heterocyclic structure may include an additional nitrogen atom in addition to the nitrogen atom in Formula 4 to which $R_1$ and $R_2$ are linked as long as the heterocyclic structure is formed. The heterocyclic structure may have no unsaturated bond such as a carbon-carbon double bond, or may have at least one unsaturated bond, if necessary. Also, the heterocyclic structure may be optionally substituted with at least one substituent.

Examples of the compound of Formula 4 may include (meth)acrylamide, N-alkyl acrylamide, N-hydroxyalkyl (meth)acrylamide or N-acryloyl morpholine, but it is not limited thereto.

The radically polymerizable compound may also be a compound including a heterocyclic acetal structure. The term "heterocyclic acetal structure" as used herein may refer to a heterocyclic structure including a structure in which two oxygen atoms are bound to the same carbon atom through a single bond. That is, the compound may be a compound including both of the functional group having a heterocyclic acetal structure and the radically polymerizable functional group. For example, the compound may serve as a diluent to regulate the viscosity of a composition, and may also be used to improve an adhesion strength to the liquid crystal layer.

The heterocyclic acetal structure may have 4 to 20, 4 to 16, 4 to 12 or 4 to 8 ring-membered atoms, and may be optionally substituted with at least one substituent.

In one embodiment, the heterocyclic acetal structure may be represented by the following Formula 5 or 6. Therefore, the radically polymerizable compound may include a monovalent residue derived from the compound of the following Formula 5 or 6 along with the radically polymerizable functional group.

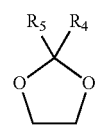

Formula 5

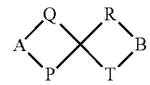

Formula 6

In Formula 5 or 6, $R_4$ and $R_5$ each independently represent hydrogen or an alkyl group, Q, P, R and T are each independently a carbon atom or an oxygen atom, provided that two of Q, P, R and T are oxygen atoms, and A and B each independently represent an alkylene or alkylidene group having 1 to 5 carbon atoms.

In one embodiment, the radically polymerizable compound having the heterocyclic acetal structure may be a compound represented by the following Formula 7.

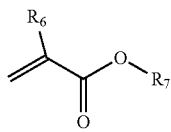

Formula 7

In Formula 7, $R_6$ represents hydrogen or an alkyl group, and $R_7$ is a monovalent residue derived from the compound of Formula 5 or 6, or an alkyl group substituted with the monovalent residue.

Examples of the compound represented by Formula 7 may include (2-ethyl-2-methyl-1,3-dioxolane-4-yl)methyl acrylate, (2-isobutyl-2-methyl-1,3-dioxolane-4-yl)methyl acrylate or (1,4-dioxaspiro[4,5]dec-2-yl)methyl acrylate, but it is not limited thereto.

In one embodiment, the radically polymerizable compound may be a monomer represented by one of Formulas 8 to 10.

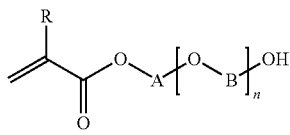

Formula 8

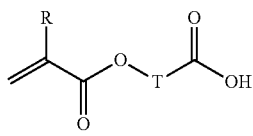

Formula 9

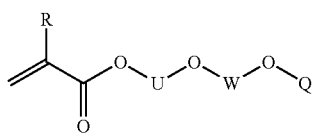

Formula 10

In Formulas 8 to 10, R is hydrogen or an alkyl group, A, B, T, U and W are each independently an alkylene group or an alkylidene group, Q is an alkyl group or an aryl group, and n is an integer ranging from 0 to 5.

Unless defined otherwise, the term "aryl group" may refer to a monovalent residue derived from a compound or a derivative thereof, which includes a benzene ring or a structure in which two or more benzene rings are condensed or joined together. The aryl group may be, for example, an aryl group having 6 to 22 carbon atoms, 6 to 16 carbon atoms, or 6 to 13 carbon atoms, such as a phenyl group, a phenylethyl group, a phenylpropyl group, a benzyl group, a tolyl group, a xylyl group or a naphthyl group.

In Formula 8, the "n" may be, for example, in a range of 0 to 3, or in a range of 0 to 2. Examples of the compound of Formula 8 may include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate, but it is not limited thereto.

In Formula 9, the "T" may be, for example, an alkylene group having 1 to 4 carbon atoms. The compound of Formula 9 may include, for example, β-carboxyethyl(meth)acrylate. In Formula 10, the "Q" may be an alkyl group having 1 to 4 carbon atoms, and the "U" and "W" may each independently be an alkylene group having 1 to 4 carbon atoms. Such a compound may include 2-(2-ethoxyethoxy)ethyl(meth)acrylate, but it is not limited thereto.

In one embodiment, the radically polymerizable compound may be a compound represented by the following Formula 11. For example, such a compound may be used to improve the durability of an adhesive.

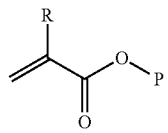

Formula 11

In Formula 11, R is hydrogen or an alkyl group, and P is a monovalent residue derived from an aliphatic saturated cyclic hydrocarbon compound.

In Formula 11, the monovalent residue may refer to a monovalent residue that is induced from an aliphatic saturated cyclic hydrocarbon compound, for example, a compound in which a carbon atom is bound to form a ring structure and which is not an aromatic compound, or a derivative thereof. The aliphatic saturated cyclic hydrocarbon compound may, for example, have 3 to 20 carbon atoms, 6 to 15 carbon atoms, or 8 to 12 carbon atoms. Examples of the monovalent residue may include an isobornyl group, a cyclohexyl group, a norbornanyl group, a norbornenyl group, a dicyclopentadienyl group, ethynylcyclohexane group, an ethynylcyclohexene group or an ethynyldecahydronaphthalene group. In one embodiment, an isobornyl group may be used, but it is not limited thereto.

In one embodiment, an isocyanate-functional acrylic ester compound may also be used as the radically polymerizable compound. As the isocyanate-functional acrylic ester compound, any compound can be used as long as it has both of an isocyanate group and an acryl group. For example, an isocyanate-functional aliphatic acrylic ester compound may be used herein. In one embodiment, a compound represented by the following Formula 12 may be used.

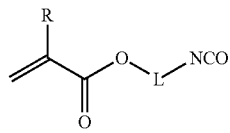

Formula 12

In Formula 12, R represents hydrogen or an alkyl group, and L represents a divalent hydrocarbon group.

In Formula 12, a divalent aliphatic hydrocarbon group may be, for example, used as the divalent hydrocarbon group. Specifically, a divalent aliphatic hydrocarbon group having 1 to 20 carbon atoms, 1 to 16 carbon atoms, 1 to 12 carbon atoms, 1 to 8 carbon atoms or 1 to 4 carbon atoms may be used. For example, the hydrocarbon group may include a linear, branched or cyclic alkylene or alkynylene group; a linear, branched or cyclic alkenylene group; or a linear, branched or cyclic alkynylene group. In one embodiment, the hydrocarbon group may be a linear or branched alkylene or alkynylene group having 1 to 8 carbon atoms.

Examples of the compound may include (meth)acryloyloxyalkyl isocyanate, more particularly (meth)acryloyloxy ($C_{1-8}$)alkyl isocyanate, more particularly (meth)acryloyloxy ($C_{1-4}$)alkyl isocyanate, and further particularly (meth)acryloyloxy ethyl isocayanate, but it is not limited thereto. In the above, the term "($C_{1-8}$)alkyl" may refer to a linear, branched or cyclic alkyl having 1, 2, 3, 4, 5, 6, 7 or 8 carbon atoms, and the term "($C_{1-4}$)alkyl" may refer to a linear, branched or cyclic alkyl having 1, 2, 3 or 4 carbon atoms.

In one embodiment, a compound represented by the following Formula 13 may be used as the isocyanate-functional acrylic ester compound.

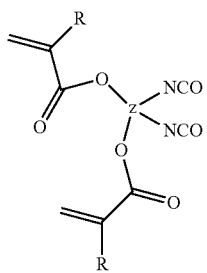

Formula 13

In Formula 13, R represents hydrogen or an alkyl group, and Z represents a tetravalent hydrocarbon group.

In the above, a tetravalent aliphatic hydrocarbon group may be, for example, used as the tetravalent hydrocarbon group. Specifically, a tetravalent aliphatic hydrocarbon group having 1 to 20 carbon atoms, 1 to 16 carbon atoms, 1 to 12 carbon atoms, 1 to 8 carbon atoms or 1 to 4 carbon atoms may be used. For example, a tetravalent hydrocarbon derived from a linear, branched or cyclic alkane; a linear, branched or cyclic alkene; or a linear, branched or cyclic alkyne may be used. The hydrocarbon group may be, for example, a tetravalent hydrocarbon derived from a linear or branched alkane group having 1 to 8 carbon atoms.

Examples of the compound may include a compound commercially available as Laromer LR9000 (BASF).

In one embodiment, a compound having a heterocyclic residue such as tetrahydrofurfuryl(meth)acrylate or (meth)acryloyl morpholine may be used as the radically polymerizable compound.

In one embodiment, the adhesive usable herein may include an adhesive including, in a cured state, a cationically curable adhesive composition including a cationically polymerizable compound, for example, an alicyclic and/or aliphatic epoxy compound, as a main component and optionally an oxetane compound or a silane compound having the cationically polymerizable functional group as a diluent or an additive; a radically curable adhesive composition including a radically polymerizable compound, for example, the acrylamide compound, as a main component and optionally another radically polymerizable compound as an additive; an adhesive composition including a radically polymerizable compound, for example, a compound represented by one of Formulas 8 to 10, as a main component and optionally another radically polymerizable compound; or a hybrid curable adhesive composition including the epoxy resin, or a mixture of the alicyclic epoxy compound and the aliphatic epoxy compound along with a radically polymerizable compound represented by one of Formulas 8 to 10, but it is not limited thereto.

The respective components in the adhesive composition and a blending ratio of the components may be properly selected in consideration of the glass transition temperature and the like.

The adhesive composition forming an adhesive may further include a polymerization initiator. The kind of the polymerization initiator may be properly selected according to the components included in the adhesive composition. For example, a cationic polymerization initiator and/or a radical polymerization initiator may be used herein.

For example, as the radical polymerization initiator, an initiator such as a benzoin compound, a hydroxyketone compound, an aminoketone compound or a phosphine oxide compound may be used, and, in one embodiment, a phosphine oxide compound may be used. Specifically, examples of the radical polymerization initiator may include benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], bis(2,4,6-trimethylbenzoyl)-phenyl-phosphine oxide and 2,4,6-trimethylbenzoyl-diphenyl-phosphine oxide, but it is not limited thereto.

As the cationic polymerization initiator, an initiator capable of releasing a component capable of initiating cationic polymerization by irradiation with active energy rays, for example, an ionized cationic initiator such as an onium salt or an organometallic salt, or a non-ionized cationic initiator such as organic silane or latent sulfonic acid, or a non-ionized compound may be used.

If necessary, the adhesive composition may further include one or more additives such as a thermal curing agent, a catalyst, a UV curing agent, a low molecular sieve, a silane coupling agent, a scattering agent, a UV stabilizer, a toning agent, a reinforcing agent, a filler, an antifoaming agent, a surfactant, a photosensitizer and a plasticizer.

In the circular polarizing plate, the optical film and the linear polarizer may be directly attached by the adhesive layer, or a primer layer may be further included between the linear polarizer and the adhesive layer or between the optical film and the adhesive layer. For example, in the circular polarizing plate 500 shown in FIG. 5, the primer layer may be disposed between the linear polarizer 401 and the adhesive layer 501 or between the adhesive layer 501 and the optical film 402. A kind of the primer layer is not specifically limited, and various kinds of the primer layer generally used to improve an adhesive property may be used.

The circular polarizing plate may further include a protective layer of the linear polarizer disposed on an opposite side of a surface in contact with the optical film of the linear polarizer, or on both sides of the linear polarizer.

The present application is also directed to a method of manufacturing a circular polarizing plate. One illustrative method may include attaching a linear polarizer and an optical film. In the method, the linear polarizer and the optical film may be attached so as for the light absorption axis of the linear polarizer to form an angle of approximately 45 or 67.5 degrees with the optical axis of the polymeric layer of the optical film, or to form an angle falling within the range from 45 to 67.5 degrees with the optical axis of the polymeric layer of the optical film.

A method of attaching the optical film and the linear polarizer is not specifically limited. For example, the method may include coating the adhesive composition described above on one surface of the linear polarizer or optical film, laminating the linear polarizer and the optical film by means of the coating layer and curing the adhesive composition, or laminating the linear polarizer and the optical film by dropping using the adhesive composition and curing the adhesive composition. Here, the adhesive composition may be cured by irradiating active energy rays having a suitable intensity with a suitable quantity in consideration of a component included in the composition.

In one embodiment, the method of preparing the circular polarizing plate may be sequentially and continuously performed following the method of manufacturing an optical film described above. For example, referring to FIG. 3, during transferring the polymeric layer along one direction M, for example, the direction forming an angle of approximately 45 or 67.5 degrees with the optical axis OP of the polymeric layer 101 or the direction forming an angle falling with the range from approximately 45 to 67.5 degrees, the optical film is prepared by forming the liquid crystal layer on the polymeric layer 101. In the above, the liquid crystal layer may be formed so as for the optical axis OP of the liquid crystal layer to be substantially perpendicular to or to form an angle of approximately 61.5 degrees with the optical axis OP of the polymeric layer 101.

The circular polarizing plate may be manufactured by constantly transferring the optical film previously manufactured in the transfer direction M and attaching the linear polarizer. In this step, the circular polarizing plate may be effectively and constantly manufactured by placing the linear polarizer so as for the light absorption axis of the linear polarizer to be parallel to the transfer direction M of the film.

When attaching the linear polarizer, in case where the optical axis of the polymeric layer is perpendicular to the optical axis of the liquid crystal layer, the liquid absorption axis of the linear polarizer may form an angle of approximately 45 degrees with the optical axis of the polymeric layer, and in case where the optical axis of the polymeric layer forms an angle of 61.5 degrees with the optical axis of the liquid crystal layer, the light absorption axis of the linear polarizer may form an angle of approximately 67.5 degrees with the optical axis of the polymeric layer.

The present application is also directed to a display device. In one embodiment, the display device may include the circular polarizing plate described above.

A kind of the display device including the circular polarizing plate is not specifically limited. The device may be a liquid crystal display (LCD) such as a reflective LCD or transflective LCD, or an organic light emitting device (OLED).

In the display device, an arrangement of the circular polarizing plate is not specifically limited, and a known arrangement may be employed. For example, in the reflective LCD, the circular polarizing plate may be one of polarizing plates for an LCD panel to prevent reflection of external light and ensure visibility. In addition, in an OLED, to prevent reflection of the external light and ensure visibility, the circular polarizing plate may be arranged outside an electrode layer of the OLED.

DETAILED DESCRIPTION OF ILLUSTRATIVE EMBODIMENTS

Figure 1:
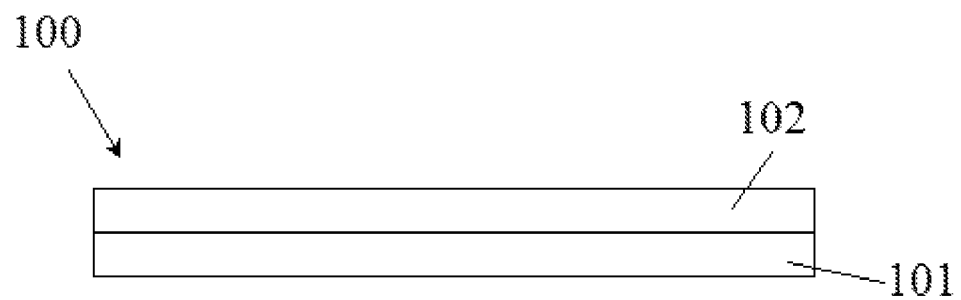
FIGS. 1 and 2 show illustrative embodiments of optical films.
Figure 2:
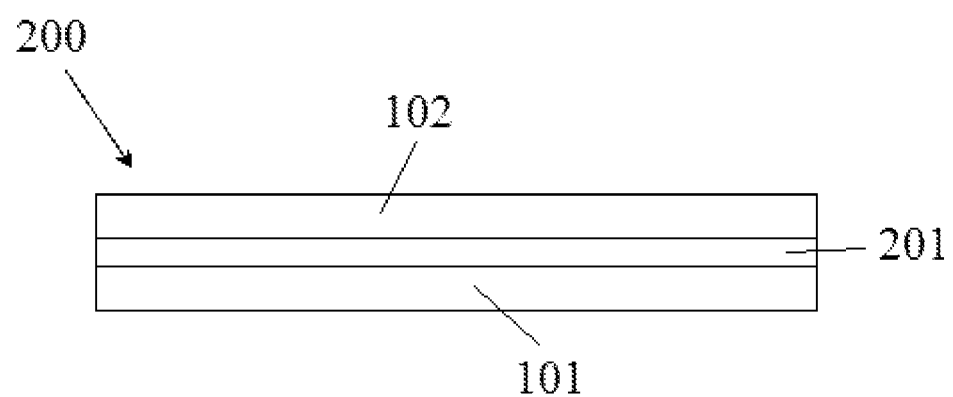
Figure 3:
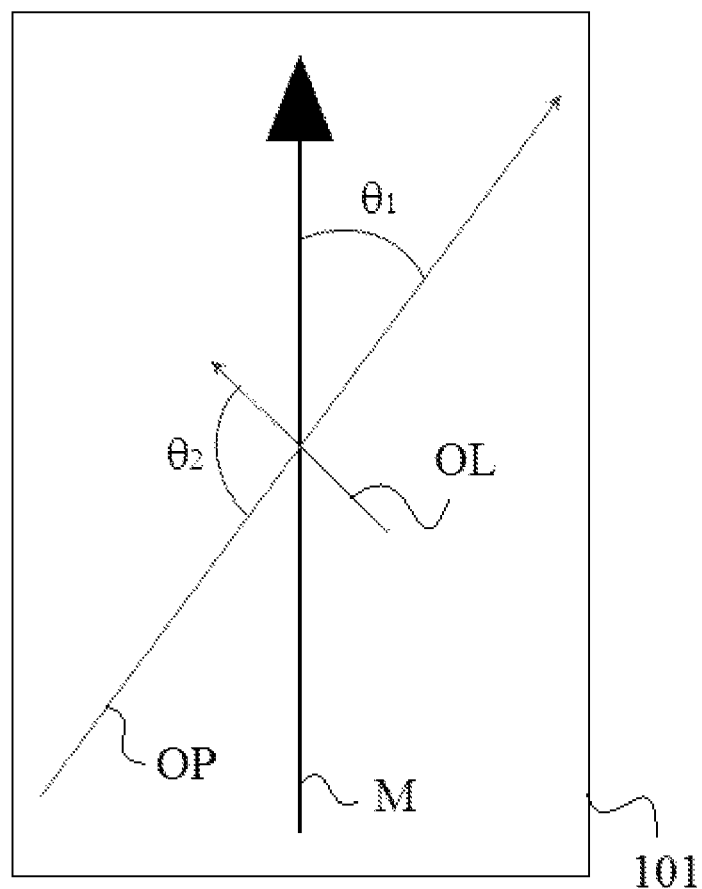
FIG. 3 shows one illustrative embodiment of a method for manufacturing an optical film.
Figure 4:
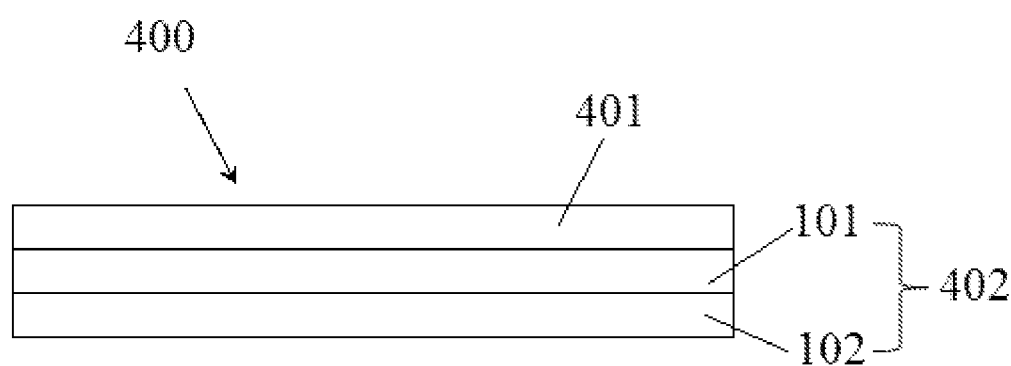
FIGS. 4 and 5 show illustrative embodiments of circular polarizing plates.
Figure 5:
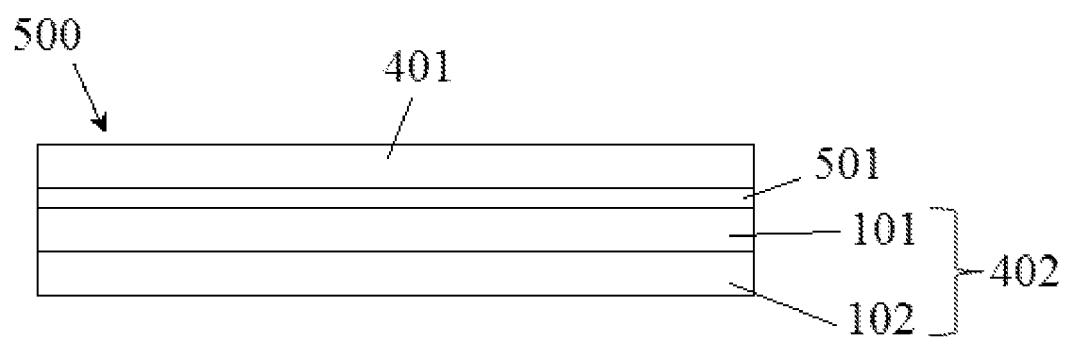

Hereinafter, the optical film will be described in detail with reference to Examples and Comparative Examples, but ranges of the optical film are not limited by the following Example.

Hereinafter, in Examples and Comparative Examples, physical properties may be evaluated by the following methods:

1. Value of Phase Retardation

In-plane phase retardation of a polymeric layer, a liquid crystal layer or an optical film was measured using an apparatus (Axoscan, manufactured by Axomatrics Co.) capable of measuring 16 Muller matrices. Specifically, 16 Muller matrices were calculated according to the manufacturer's manual using the apparatus, and thereby phase retardation was extracted.

2. Polarizance Ellipticity

Polarizance Ellipticity is a value showing an efficiency of a circular polarizing plate in Example or Comparative Example to form the circularly polarized light, and it can be measured according to the manufacturer's manual using Axoscan (Axomatrics Co.).

If the Polarizance Ellipticity is closer to 1, a circular polarization conversion efficiency will be increased, and if the Polarizance Ellipticity is 0, it indicates that linearly polarized light is generated.

Example 1

A liquid crystal layer having the in-plane phase retardation of approximately 105 nm with respect to a wavelength of 550 nm was formed on a cycloolefin polymer film having the in-plane phase retardation of 220 nm with respect to a wavelength of 550 nm as a polymeric layer by the following method.

Specifically, a composition for forming a photo-alignment layer was coated on one surface of the cycloolefin polymer film so as for the layer to have a thickness of approximately 1,000 Å after being dried, and dried in an 80° C. oven for 2 minutes. The composition for forming the photo-alignment layer was prepared by mixing a mixture of polynorbornenes (molecular weight ($M_w$)=150,000) having a cinnamate group represented by Formula A and acrylic monomers with photoinitiators (Igacure 907) and then dissolving the obtained mixture (polynorbornene:acryl monomer:photoinitiator=2:1:0.25 (weight ratio)) in cyclopentanone so as for the solid content of the polynorbornene to be 2 weight %.

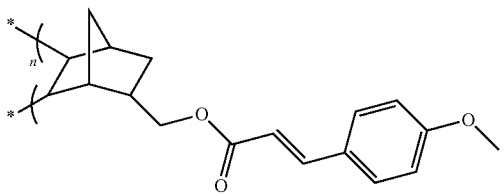

[Formula A]

Subsequently, the dried composition for forming the photo-alignment layer was aligned, thereby forming the photo-alignment layer. Here, the alignment was performed so as for the optical axis of the liquid crystal layer formed by the alignment layer to form an angle of approximately 61.5 degrees with the optical axis of the cycloolefin polymer film. Specifically, a wire grid polarizing plate capable of generating linearly polarized light was placed on the dried composition in consideration of a place of forming the optical axis, the cycloolefin polymer film was transferred at a speed of approximately 3 m/min, and alignment was performed by irradiating the composition with ultraviolet rays (300 mW/cm$^2$) to form a photo-alignment layer by means of the polarizing plate for approximately 30 seconds. Subsequently, the liquid crystal layer was formed on the alignment layer. Specifically, the liquid crystal composition including 70 parts by weight of the multifunctional polymerizable liquid crystal compound represented by Formula B and 30 parts by weight of the monofunctional polymerizable liquid crystal compound represented by Formula C as liquid crystal compositions and including a suitable amount of a photoinitiator were coated so as for the thickness to be approximately 1 μm after being dried, and aligned according to alignment of the underlying alignment layer. Afterward, ultraviolet rays (300 mW/cm$^2$) were irradiated for approximately 10 seconds to crosslink and polymerize liquid crystal compounds, thereby forming the liquid crystal layer having an optical axis forming an angle of approximately 61.5 degrees with an optical axis of the cycloolefin polymer film. As a result, an optical film was manufactured.

Subsequently, a conventional PVA (poly(vinyl alcohol)) linear polarizer was attached to the manufactured optical film, and thereby a circular polarizing plate was manufactured. The attachment was performed for the linear polarizing plate to be attached to the cycloolefin film, and in this step, the light absorption axis of the linear polarizer formed an angle of approximately 67.5 degrees with the optical axis of the cycloolefin polymer film.

Example 2

An optical film and a circular polarizing plate were manufactured by the substantially same method as in Example 1, except that the liquid crystal layer was formed so as for the in-plane phase retardation with respect to a wavelength of 550 nm to be approximately 135 nm, the optical axis of the liquid crystal layer was controlled to be substantially perpendicular to the optical axis of the cycloolefin polymer film, and the optical axis of the cycloolefin polymer film was controlled to form an angle of approximately 45 degrees with the light absorption axis of the linear polarizer.

Comparative Example 1

A circular polarizing plate was manufactured by attaching a PVA linear polarizer and a cycloolefin polymer film having the in-plane phase retardation with respect to light with a wavelength of 550 nm of approximately 140 nm. The attachment was performed so as for the light absorption axis of the linear polarizer to form an angle of approximately 45 degrees with the optical axis of the cycloolefin polymer film.

Comparative Example 2

A circular polarizing plate was manufactured by forming a liquid crystal layer by a method similar to that described in Example 1 on a PVA linear polarizer. In this step, the liquid crystal layer was formed to have the in-plane phase retardation with respect to light with a wavelength of 550 nm of approximately 135 nm, and the optical axis of the liquid crystal layer formed an angle of approximately 45 degrees with the light absorption axis of the linear polarizer.

Physical properties measured with respect to the circular polarizers in Examples and Comparative Examples are listed in Table 1.

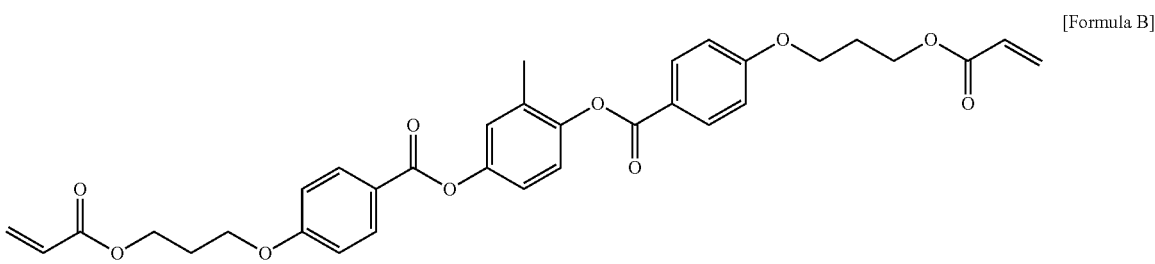

[Formula B]

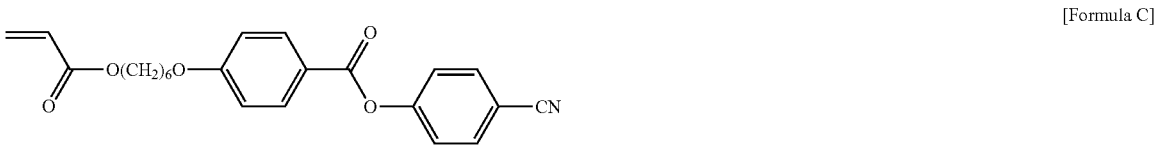

[Formula C]

TABLE 1

| | Cycloolefin Polymer Film | | Liquid Crystal Layer | | Polarizance Ellipticity | | | Achromaticity |
|---|---|---|---|---|---|---|---|---|
| | Re (nm) | OP (degrees) | Re (nm) | OP (degrees) | 450 nm | 550 nm | 650 nm | |
| Example 1 | 220 | 67.5 | 105 | 6 | 0.90 | 0.98 | 0.85 | ○ |
| Example 2 | 270 | 45 | 135 | −45 | 0.88 | 0.94 | 0.81 | ○ |
| Comparative Example 1 | 140 | 45 | — | — | 0.67 | 0.97 | 0.79 | X |
| Comparative Example 2 | — | — | 135 | 45 | 0.60 | 0.93 | 0.69 | X |

Re: the in-plane phase retardation with respect to 550 nm light of the cycloolefin polymer polymer film or the liquid crystal layer (unit: nm)
OP: the angle that the optical axis of the cycloolefin polymer film or the liquid crystal layer forms clockwise with the light absorption axis of the linear polarizer in circular polarizing plate (unit: degrees)
Polarizance Ellipticity: Polarizance Ellipticity measured with respect to light having a wavelength of 450 nm, 550 nm or 650 nm
Achromaticity was evaluated by evaluating anti-reflection property of the manufactured circular polarizing plate (if visibility of circular polarizing plate is close to black, it is represented as ○, and if circular polarizing plate exhibits color, it is represented as X)

Experimental Example

An optical film and a circular polarizing plate were manufactured by the same method as described in Example 1, except that a cycloolefin polymer film having the in-plane phase retardation with respect to light with a wavelength of 550 nm of approximately 270 nm, and R(450)/R(550) of 1 or R(650)/R(550) of 1 was used as the polymer film, and the liquid crystal layer formed using a liquid crystal composition adjusted to have the in-plane phase retardation with respect to light with a wavelength of 550 nm of approximately 135 nm, R(450)/R(550) of 1.09, or R(650)/R(550) of 0.93 was used. In the optical film or circular polarizing plate, an optical axis of the liquid crystal layer was substantially perpendicular to an optical axis of the cycloolefin polymer film, and the optical axis of the cycloolefin polymer film formed an angle of approximately 45 degrees with the light absorption axis of the linear polarizer.

Polarizance ellipticities of the circular polarizing plate measured by the same method described in Examples and Comparative Examples were approximately 0.88 with respect to 450 nm light, approximately 0.94 with respect to 550 nm light, and approximately 0.81 with respect to 650 nm light. In addition, achromaticities were examined by the same method as described in Examples and Comparative Examples, and the black visibility was shown.

According to an illustrative embodiment of the present application, an optical film can exhibit a desired phase retardation property in a wide wavelength range even when it is relatively thin. In an embodiment, the optical film can exhibit the ¼ wavelength phase retardation property. The optical film can be manufactured by simple processes. The optical film can be used in LCDs such as a reflective LCD, or OLEDs.

What is claimed is:

1. An optical film of which R(650)/R(550) is larger than R(450)/R(550), comprising:
   an optically anisotropic polymeric layer which has an absolute value of a difference between R(450)/R(550) and R(650)/R(550) of 5 or less; and
   a liquid crystal layer which has R(450)/R(550) that is larger than R(650)/R(550) and of which an optical axis forms an angle of 61.5 degrees with the optical axis of the polymeric layer, on the polymeric layer.

2. The optical film of claim 1, wherein the optical film has the ¼ wavelength retardation property.

3. The optical film of claim 1, wherein the optical film has the in-plane phase retardation with respect to light having the wavelength of 550 nm in the range from 110 nm to 220 nm.

4. The optical film of claim 3, wherein the R(450)/R(550) of the optical film is 0.81 to 0.99, and the R(650)/R(550) is 1.01 to 1.19.

5. The optical film of claim 1, wherein the polymeric layer has the in-plane phase retardation with respect to light having the wavelength of 550 nm in the range from 200 to 290 nm.

6. The optical film of claim 5, wherein the polymeric layer has the R(450)/R(550) in the range from 0.95 to 1.05, and the R(650)/R(550) in the range from 0.95 to 1.05.

7. The optical film of claim 1, wherein the polymeric layer comprises a polyolefin film, a cycloolefin polymer film, a polyvinylchloride film, a polyacrylonitrile film, a polysulfone film, a polyacrylate film, a polyvinylalcohol film or a cellulose ester polymer film, or a copolymer film of at least two monomers selected from monomers forming the above polymer.

8. The optical film of claim 1, wherein the optical axis of the polymeric layer forms an angle of 45 or 67.5 degrees with a lengthwise direction or a breadthwise direction of the polymeric layer, or forms an angle falling with the range from 45 to 67.5 degrees with the lengthwise direction or the breadthwise direction of the polymeric layer.

9. The optical film of claim 1, wherein the liquid crystal layer has the in-plane phase retardation with respect to light having the wavelength of 550 nm of 95 to 145 nm.

10. The optical film of claim 9, wherein the liquid crystal layer has the R(450)/R(550) in the range from 1.01 to 1.19, and the R(650)/R(550) in the range from 0.81 to 0.99.

11. The optical film of claim 1, wherein a difference between the refractive index of the liquid crystal layer in the in-plane slow axis direction and the refractive index of the liquid crystal layer in the in-plane fast axis direction may be from 0.05 to 0.2, and wherein the liquid crystal layer has the thickness from 0.5 to 2.0 μm.

12. A circular polarizing plate, comprising:
   a linear polarizer; and
   the optical film of claim 1 on one surface of the linear polarizer.

13. The circular polarizing plate of claim 12, wherein the light absorption axis of the linear polarizer forms an angle of 45 or 67.5 degrees or forms an angle falling within the range from 45 to 67.5 degrees with the optical axis of the polymeric layer of the optical film.

14. The circular polarizing plate of claim 12, further comprising:
an adhesive layer that attaches the linear polarizer and the optical film and has a glass transition temperature of 36° C. or more.

15. A display device comprising the circular polarizing plate of claim 12.

16. The display device of claim 15, which is a reflective liquid crystal display, a transflective liquid crystal display or an organic light emitting device.

17. An optical film of which R(650)/R(550) is larger than R(450)/R(550), comprising:
an optically anisotropic polymeric layer which has an absolute value of a difference between R(450)/R(550) and R(650)/R(550) of 5 or less; and
a liquid crystal layer which has R(450)/R(550) that is larger than R(650)/R(550) and of which an optical axis is formed to be perpendicular to an optical axis of the polymeric layer, on the polymeric layer.

18. The optical film of claim 17, wherein the optical film has the ¼ wavelength retardation property.

19. The optical film of claim 17, wherein the optical film has the in-plane phase retardation with respect to light having the wavelength of 550 nm in the range from 110 nm to 220 nm.

20. The optical film of claim 17, wherein the R(450)/R(550) of the optical film is 0.81 to 0.99, and the R(650)/R(550) is 1.01 to 1.19.

21. The optical film of claim 17, wherein the polymeric layer has the in-plane phase retardation with respect to light having the wavelength of 550 nm in the range from 200 to 290 nm.

22. The optical film of claim 17, wherein the polymeric layer has the R(450)/R(550) in the range from 0.95 to 1.05, and the R(650)/R(550) in the range from 0.95 to 1.05.

23. The optical film of claim 17, wherein the polymeric layer comprises a polyolefin film, a cycloolefin polymer film, a polyvinylchloride film, a polyacrylonitrile film, a polysulfone film, a polyacrylate film, a polyvinylalcohol film or a cellulose ester polymer film, or a copolymer film of at least two monomers selected from monomers forming the above polymer.

24. The optical film of claim 17, wherein the optical axis of the polymeric layer forms an angle of 45 or 67.5 degrees with a lengthwise direction or a breadthwise direction of the polymeric layer, or forms an angle falling with the range from 45 to 67.5 degrees with the lengthwise direction or the breadthwise direction of the polymeric layer.

25. The optical film of claim 17, wherein the liquid crystal layer has the R(450)/R(550) in the range from 1.01 to 1.19, and the R(650)/R(550) in the range from 0.81 to 0.99.

26. The optical film of claim 17, wherein a difference between the refractive index of the liquid crystal layer in the in-plane slow axis direction and the refractive index of the liquid crystal layer in the in-plane fast axis direction may be from 0.05 to 0.2, and wherein the liquid crystal layer has the thickness from 0.5 to 2.0 μm.

27. A circular polarizing plate, comprising:
a linear polarizer; and
the optical film of claim 17 on one surface of the linear polarizer.

28. The circular polarizing plate of claim 27, wherein the light absorption axis of the linear polarizer forms an angle of 45 or 67.5 degrees or forms an angle falling within the range from 45 to 67.5 degrees with the optical axis of the polymeric layer of the optical film.

29. The circular polarizing plate of claim 27, further comprising:
an adhesive layer that attaches the linear polarizer and the optical film and has a glass transition temperature of 36° C. or more.

30. A display device comprising the circular polarizing plate of claim 27.

31. The display device of claim 30, which is a reflective liquid crystal display, a transflective liquid crystal display or an organic light emitting device.

32. The optical film of claim 17, wherein the liquid crystal layer has the in-plane phase retardation with respect to light having the wavelength of 550 nm of 95 to 145 nm.

\* \* \* \* \*